(12) United States Patent
Hirashima et al.

(10) Patent No.: US 9,487,221 B2
(45) Date of Patent: Nov. 8, 2016

(54) RAILCAR BODYSHELL AND RAILCAR INCLUDING SAME

(71) Applicant: KAWASAKI JUKOGYO KABUSHIKI KAISHA, Kobe-shi, Hyogo (JP)

(72) Inventors: Toshiyuki Hirashima, Kobe (JP); Heishou Ko, Kobe (JP)

(73) Assignee: KAWASAKI JUKOGYO KABUSHIKI KAISHA, Kobe-shi (JP)

( * ) Notice: Subject to any disclaimer, the term of this patent is extended or adjusted under 35 U.S.C. 154(b) by 107 days.

(21) Appl. No.: 14/396,469

(22) PCT Filed: Apr. 17, 2013

(86) PCT No.: PCT/JP2013/002588
§ 371 (c)(1),
(2) Date: Oct. 23, 2014

(87) PCT Pub. No.: WO2013/161218
PCT Pub. Date: Oct. 31, 2013

(65) Prior Publication Data
US 2015/0090152 A1    Apr. 2, 2015

(30) Foreign Application Priority Data

Apr. 23, 2012  (JP) ................. 2012-097557

(51) Int. Cl.
*B61D 17/00*  (2006.01)
*B61D 17/08*  (2006.01)

(52) U.S. Cl.
CPC ............... *B61D 17/00* (2013.01); *B61D 17/08* (2013.01); *B23K 2201/006* (2013.01)

(58) Field of Classification Search
CPC .............................. B61D 17/00; B61D 17/08
See application file for complete search history.

(56) References Cited

U.S. PATENT DOCUMENTS

| 2,657,645 | A | * | 11/1953 | Ecoff | B61D 17/18 105/401 |
| 3,631,817 | A | * | 1/1972 | O'Neill | B61D 17/08 105/401 |
| 4,337,708 | A | * | 7/1982 | Peterson | B23K 9/0256 105/397 |
| 4,794,972 | A | * | 1/1989 | Hormann | E06B 3/485 160/236 |
| 5,303,658 | A | * | 4/1994 | Kohira | B61D 17/04 105/400 |
| 5,555,699 | A | * | 9/1996 | Borthick | B62D 25/2054 403/237 |

(Continued)

FOREIGN PATENT DOCUMENTS

| DE | 850389 C | 9/1952 |
| JP | S61-186665 U | 11/1986 |

(Continued)

OTHER PUBLICATIONS

Mar. 24, 2015 Office Action with Search Report issued in Taiwanese Patent Application No. 102113920.

(Continued)

*Primary Examiner* — Jason C Smith
(74) *Attorney, Agent, or Firm* — Oliff PLC (57) ABSTRACT

The present invention includes: an outside plate; first frames each including a first head portion; and second frames each including a second head portion and arranged perpendicular to the first frames. At each of portions where the first frames and the second frames intersect with each other, the second head portion is arranged on the first head portion so as to overlap the first head portion.

7 Claims, 12 Drawing Sheets

(56) References Cited

U.S. PATENT DOCUMENTS

| | | | | |
|---|---|---|---|---|
| 7,500,714 B2* | 3/2009 | Abe | ............... | B62D 21/157 296/187.09 |
| 7,854,472 B2* | 12/2010 | Gomi | ............... | B62D 25/20 296/193.07 |
| 2009/0108633 A1* | 4/2009 | Ohi | ............... | B62D 25/2036 296/204 |
| 2010/0078966 A1* | 4/2010 | Onoda | ............... | B62D 25/2036 296/193.07 |
| 2010/0264884 A1* | 10/2010 | Fourmy | ............... | H02P 9/08 322/23 |
| 2012/0042805 A1* | 2/2012 | Umebayashi | ............... | B29C 70/088 105/396 |
| 2013/0104770 A1* | 5/2013 | Nakao | ............... | B61D 15/06 105/392.5 |
| 2013/0125782 A1* | 5/2013 | Ishizuka | ............... | B61D 15/06 105/392.5 |
| 2015/0090152 A1* | 4/2015 | Hirashima | ............... | B61D 17/08 105/396 |
| 2015/0291185 A1* | 10/2015 | Hirashima | ............... | B61D 17/08 105/418 |

FOREIGN PATENT DOCUMENTS

| | | | |
|---|---|---|---|
| JP | 2006-027366 A | | 2/2006 |
| JP | 2006027366 A | * | 2/2006 |
| JP | A-2008-126758 | | 6/2008 |
| JP | 2009-035123 A | | 2/2009 |
| JP | 2010264884 A | * | 11/2010 |
| JP | A-2010-264884 | | 11/2010 |
| KR | 20-1999-0030849 U | | 7/1999 |
| KR | 10-2005-0032675 A | | 4/2005 |

OTHER PUBLICATIONS

International Search Report issued in International Patent Application No. PCT/JP2013/002588 dated Jul. 30, 2013.
Oct. 20, 2015 Office Action issued in Japanese Patent Application No. 2012-97557.
Feb. 14, 2016 Search Report issued in Chinese Patent Application No. 201380019120.

* cited by examiner

RAILCAR BODYSHELL AND RAILCAR INCLUDING SAME

TECHNICAL FIELD

The present invention relates to a railcar bodyshell and a railcar including the railcar bodyshell, and particularly to a railcar bodyshell and a railcar, each of which suppresses a reduction in a railcar interior space and facilitates the arrangement and attachment of installed properties.

BACKGROUND ART

A railcar includes side bodyshells, end bodyshells, and a roof bodyshell, and each of the bodyshells includes an outside plate panel configured such that two frames (posts) perpendicular to each other are attached to an outside plate to stiffen the outside plate. One example of the bodyshell including such outside plate panel is a railcar bodyshell described in PTL 1. In this railcar bodyshell, horizontal posts extending in a railcar longitudinal direction are welded to the outside plate, and vertical posts extending in an upper-lower direction are lined up in the railcar longitudinal direction so as to be placed on the horizontal posts. Joint members (so-called gadgets) are provided so as to each cover a portion where two posts intersect with each other, so that the vertical posts and the horizontal posts are coupled to one another.

CITATION LIST

Patent Literature

PTL 1: Japanese Laid-Open Patent Application Publication No. 2008-126758

SUMMARY OF INVENTION

Technical Problem

In the railcar bodyshell of PTL 1, since the vertical posts are directly disposed on the horizontal posts, there is a problem that the outside plate panel increases in thickness and this decreases the railcar interior space.

Various installed properties, such as seats, need to be attached to a railcar inner side of the outside plate panel. However, since the vertical posts are arranged on the horizontal posts in the railcar bodyshell of PTL 1, head surfaces of the horizontal posts are not flat. Therefore, the arrangement and attachment of the seats and the like are significantly restricted.

Further, in the railcar bodyshell of PTL 1, the joint members are used to couple the vertical posts and the horizontal posts. Therefore, the number of parts increases, and this increases the manufacturing cost.

Here, an object of the present invention is to provide a railcar bodyshell capable of suppressing a reduction in a railcar interior space.

Another object of the present invention is to provide a railcar bodyshell capable of reducing work of attaching installed properties, such as seat members.

Yet another object of the present invention is to provide a railcar bodyshell capable of reducing the number of parts.

Solution to Problem

A railcar bodyshell of the present invention includes: an outside plate; first frames each including a plate-shaped first head portion and arranged at an inner surface of the outside plate, the first head portion having a surface spaced apart from and substantially parallel to the outside plate; and second frames each including a plate-shaped second head portion and arranged perpendicular to the first frames, the second head portion being spaced apart from the outside plate, wherein at each of portions where the first frames and the second frames intersect with each other, the second head portion is arranged on the first head top portion so as to overlap the first head portion.

According to the present invention, since the second head portion formed in a plate shape overlaps the first head portion, the outside plate panel can be reduced in thickness. With this, the reduction in the railcar interior space can be suppressed. In addition, since the first frames and the second frames are joined to each other without using the joint members, the second head portions can be made flat. Thus, the installed properties, such as seats, are easily attached. Further, since it is unnecessary to use the joint members when joining the first frames and the second frames, the number of parts can be reduced.

Advantageous Effects of Invention

According to the present invention, the reduction in the railcar interior space can be suppressed. In addition, according to the present invention, work of attaching the installed properties, such as the seat members, can be reduced. Further, according to the present invention, the increases in the number of parts and the attachment cost can be suppressed.

The above object, other objects, features, and advantages of the present invention will be made clear by the following detailed explanation of preferred embodiments with reference to the attached drawings.

DESCRIPTION OF EMBODIMENTS

Hereinafter, a railcar (hereinafter may be simply referred to as a "car") 2 according to Embodiment 1 of the present invention will be explained in reference to the drawings. A concept of directions in respective embodiments corresponds to a concept of directions when a running direction of the railcar is defined as a front direction. To be specific, a railcar longitudinal direction (hereinafter may be simply referred to as a "longitudinal direction") corresponds to a front-rear direction, and a railcar width direction corresponds to a left-right direction. A side bodyshell 1 and the railcar 2 explained below are just embodiments of the present invention. To be specific, the present invention is not limited to the embodiments below, and additions, deletions, and modifications may be made within the scope of the present invention.

Embodiment 1

Railcar

Figure 1:
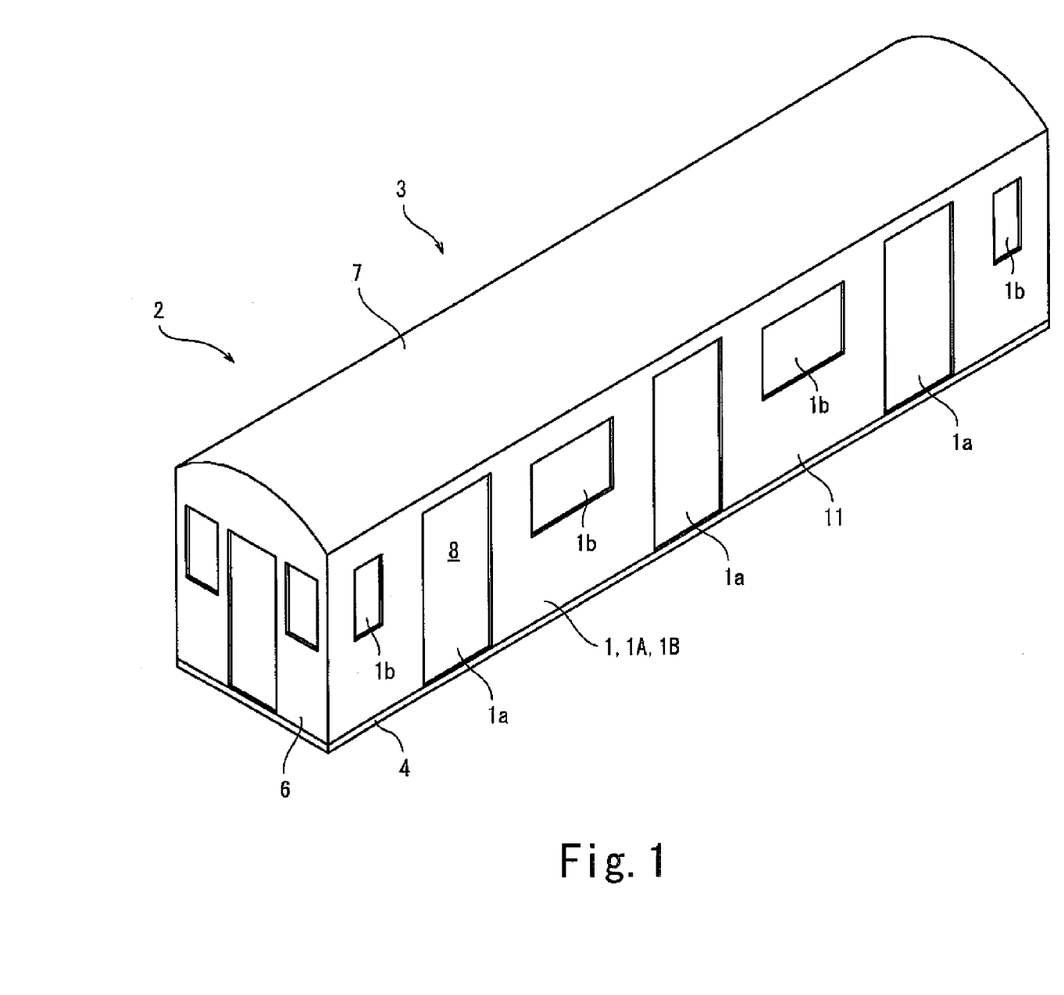
FIG. 1 is a perspective view schematically showing a railcar including side bodyshells according to an embodiment of the present invention.

The railcar 2 includes two bogies (not shown) that travel on railway tracks. A carbody 3 is disposed on these two bogies via air springs, not shown. As shown in FIG. 1, the carbody 3 includes an underframe 4 located at a bottom portion of the carbody 3.

The underframe 4 has a substantially rectangular shape that is long in the front-rear direction in plan view. The underframe 4 is disposed on the two bogies via the air springs. Side bodyshells 1 respectively stand on both railcar width direction end portions of the underframe 4 so as to form a pair. A plurality of entrance openings 1a and a plurality of window openings 1b are formed at the side bodyshell 1 along the longitudinal direction. A pair of end bodyshells 6 standing on the underframe 4 are respectively connected to front and rear end portions of the pair of side bodyshells 1, and a roof bodyshell 7 is provided on the side bodyshells 1 and the end bodyshells 6. The roof bodyshell 7 is provided so as to extend between a pair of left and right side bodyshells 1. The roof bodyshell 7 closes a space surrounded by the underframe 4, the side bodyshells 1, and the end bodyshells 6. The carbody 3 configured as above is formed in a substantially hollow rectangular solid shape, that is, a box shape by the underframe 4, a pair of side bodyshells 1, a pair of end bodyshells 6, and the roof bodyshell 7. A passenger room 8 (railcar interior) for accommodating passengers is formed in the carbody 3.

The side bodyshells 1, the end bodyshells 6, and the roof bodyshell 7 that constitute the passenger room 8 together with the underframe 4 are made of, for example, stainless steel. Each of the side bodyshells 1 and the end bodyshells 6 includes an outside plate panel 14 configured such that a plurality of side posts 12 and a plurality of horizontal bars 13 arranged in a parallel-cross shape are attached to a side outside plate 11 having a substantially rectangular shape to stiffen the side outside plate 11. The stiffness of each of the side bodyshells 1 and the end bodyshells 6 is secured by the outside plate panel 14. Hereinafter, the configuration of the side bodyshell 1 will be explained more specifically.

Side Bodyshell

Figure 2:
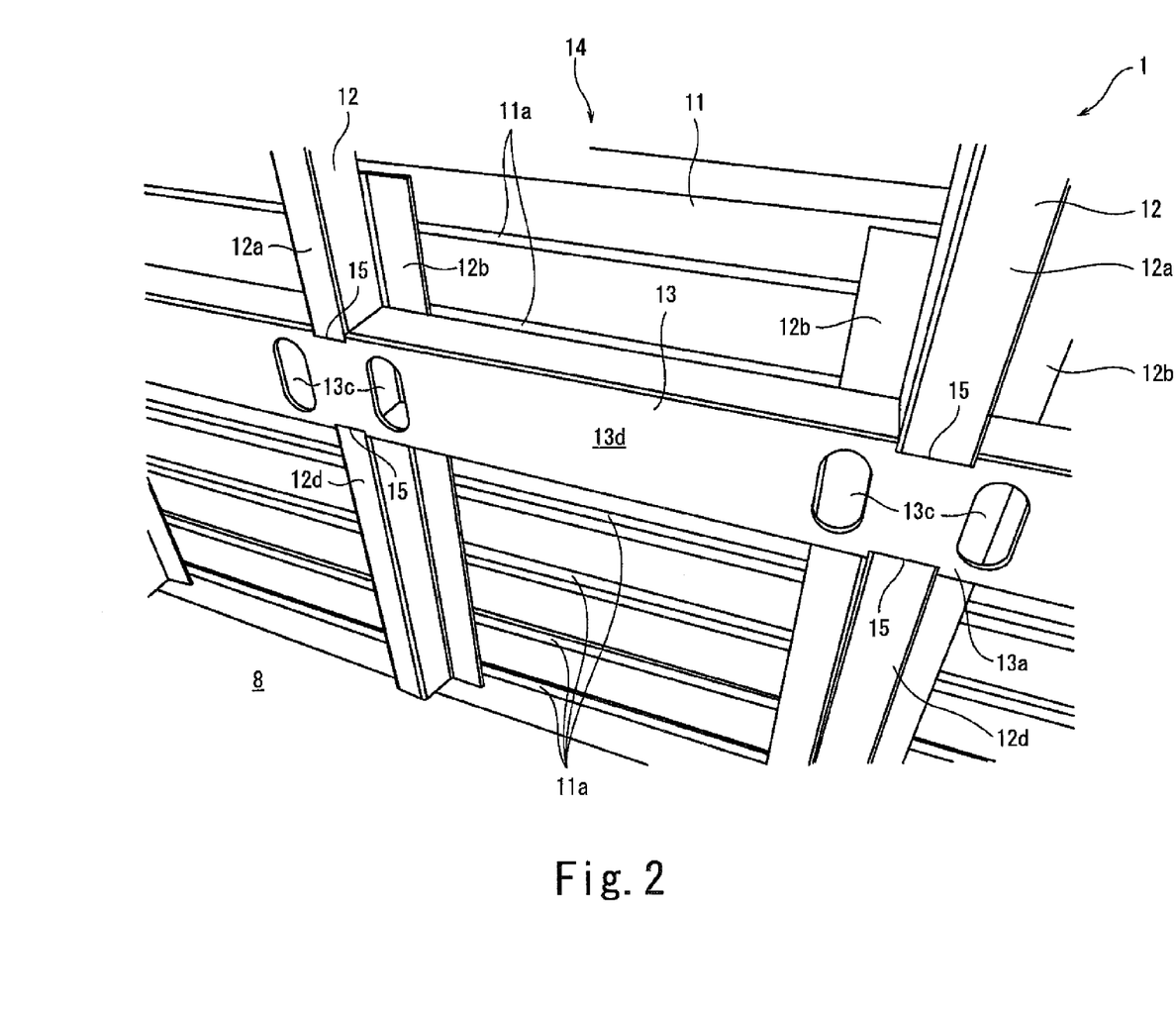
FIG. 2 is an enlarged perspective view showing a part of the side bodyshell according to Embodiment 1, when viewed from a railcar inner side.

The side bodyshell 1 includes the side outside plate 11 extending in the longitudinal direction as shown in FIG. 1. A plurality of entrances 1a and a plurality of windows 1b described above are formed at the side outside plate 11. As shown in FIG. 2, the side outside plate 11 is a corrugated plate having an outer side surface on which a plurality of beads 11a extending in the longitudinal direction are integrally provided. The side outside plate 11 may be a flat plate. A plurality of side posts 12 corresponding to first frames and a plurality of horizontal bars 13 corresponding to second frames are provided at a railcar inner side surface (corresponding to an inner surface of the outside plate) of the side outside plate 11 arranged as above.

Figure 3:
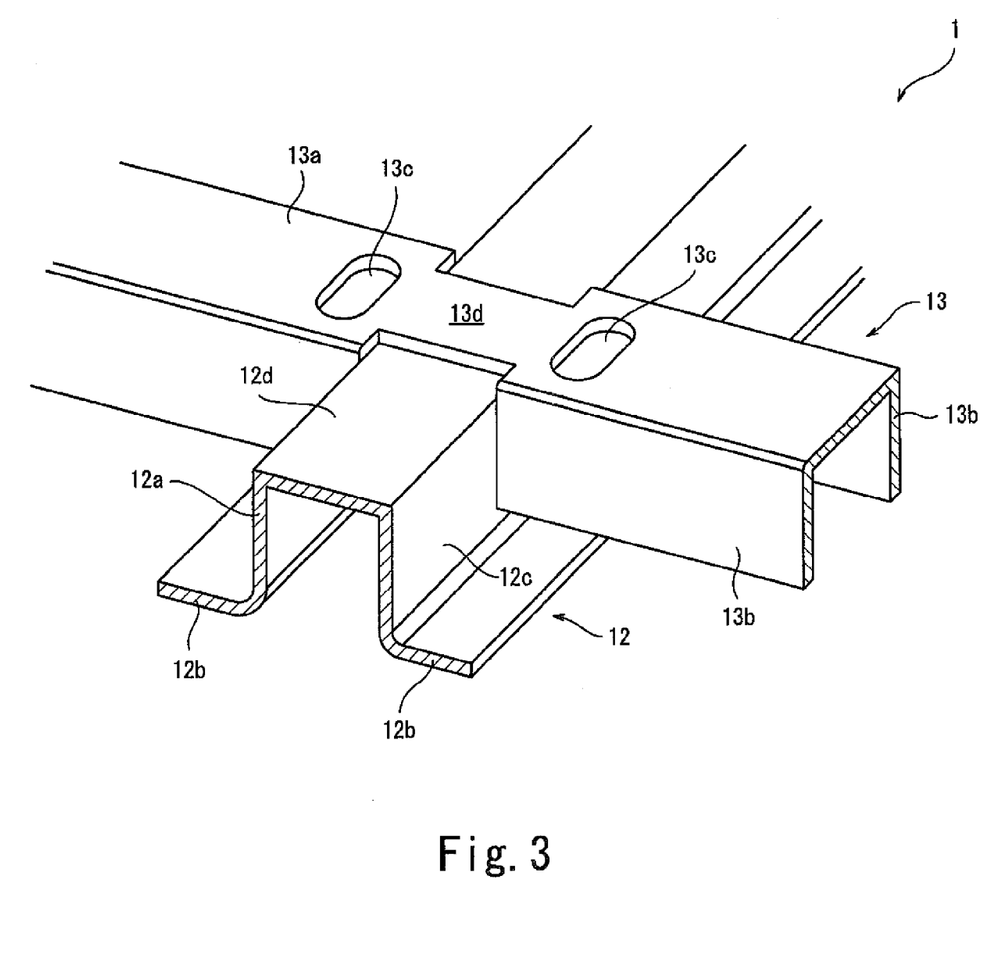
FIG. 3 is an enlarged perspective view showing a portion where a side post and a horizontal bar overlap each other.
Figure 4:
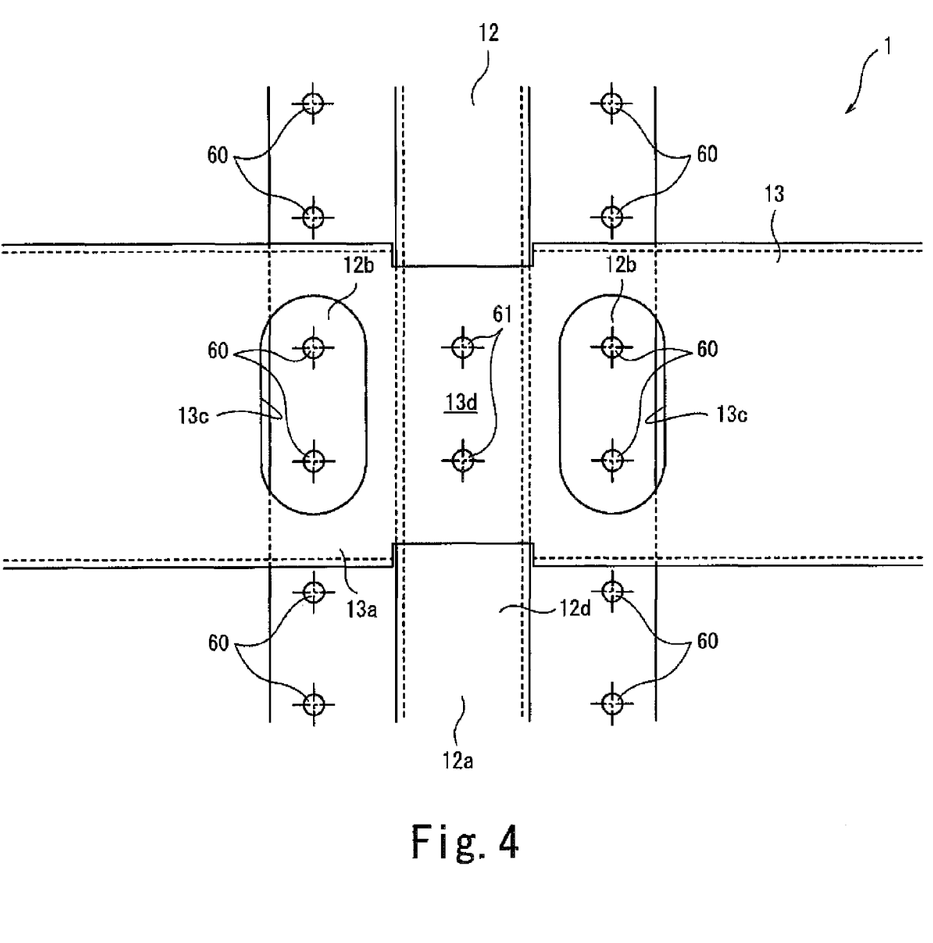
FIG. 4 is an enlarged side view showing the portion where the side post and the horizontal bar overlap each other as shown in FIG. 3.

As shown in FIG. 3, the side post 12 corresponding to the first frame is a reinforcing member extending in the upper-lower direction and having a hat-shaped cross section. The side post 12 includes a main body portion 12a and a pair of flanges 12b. The main body portion 12a is constituted by a head portion 12d and a pair of leg portions 12c extending from the head portion 12d in a direction substantially perpendicular to the head portion 12d. To be specific, in the present embodiment, the main body portion 12a is formed to have a U-shaped cross section. The flanges 12b are respectively, integrally provided at tip end portions of the leg portions 12c. The pair of flanges 12b extend in a direction substantially parallel to the head portion 12d. The head portion 12d of the main body portion 12a includes a surface spaced apart from the side outside plate 11 and substantially parallel to the side outside plate. The flange portions 12b are joined to the side outside plate 11 by spot welding 60 (see FIG. 4). Thus, the side post 12 and the side outside plate 11 are fixed to each other.

The side posts 12 fixed as above are provided in the vicinities of both longitudinal direction end portions of each of the side outside plates 11 and both longitudinal direction sides of each of the entrances 1a and the windows 1b. The side posts 12 are fixed to the side outside plate 11 so as to be spaced apart from one another in the longitudinal direction. The plurality of horizontal bars 13 are provided at the side outside plate 11. The plurality of horizontal bars 13 are arranged so as to overlap the plurality of side posts 12.

The horizontal bar 13 corresponding to the second frame is a reinforcing member extending in the longitudinal direction and having a U-shaped cross section. The horizontal bar 13 is provided between the adjacent entrances 1a. The horizontal bar 13 is formed to have a U-shaped cross section and includes a head portion 13a and a pair of leg portions 13b. Door pockets (not shown) each configured to accommodate an openable door are respectively formed at both longitudinal direction sides of the entrance 1a, and the horizontal bar 13 is arranged so as to extend between the adjacent door pockets. The head portion 13a of the horizontal bar 13 arranged as above extends in the longitudinal direction and is formed in a substantially strip plate shape.

Cutout portions 15 are respectively formed at positions, corresponding to the side post 12, of the pair of leg portions 13b so as to form a pair. The cutout portion 15 is formed so as to correspond to an outer shape of the main body portion 12a of the side post and has a substantially rectangular shape. The pair of cutout portions 15 are located so as to be opposed to each other in the upper-lower direction. The side post 12 is inserted from one of the cutout portions 15 to the other cutout portion 15. The cutout portion 15 formed as above extends from a tip end of the leg portion 13b to a base end of the leg portion 13b. The pair of leg portions 13b are formed to be shorter than the leg portions 12c of the side post 12. Therefore, the head portion 13a of the horizontal bar 13 is disposed on the head portion 12d of the inserted side post 12 to overlap the head portion 12d. As above, the horizontal bar 13 is not divided even at a position where the side post 12 is arranged, and the head portion 13a extends continuously.

Figure 5:
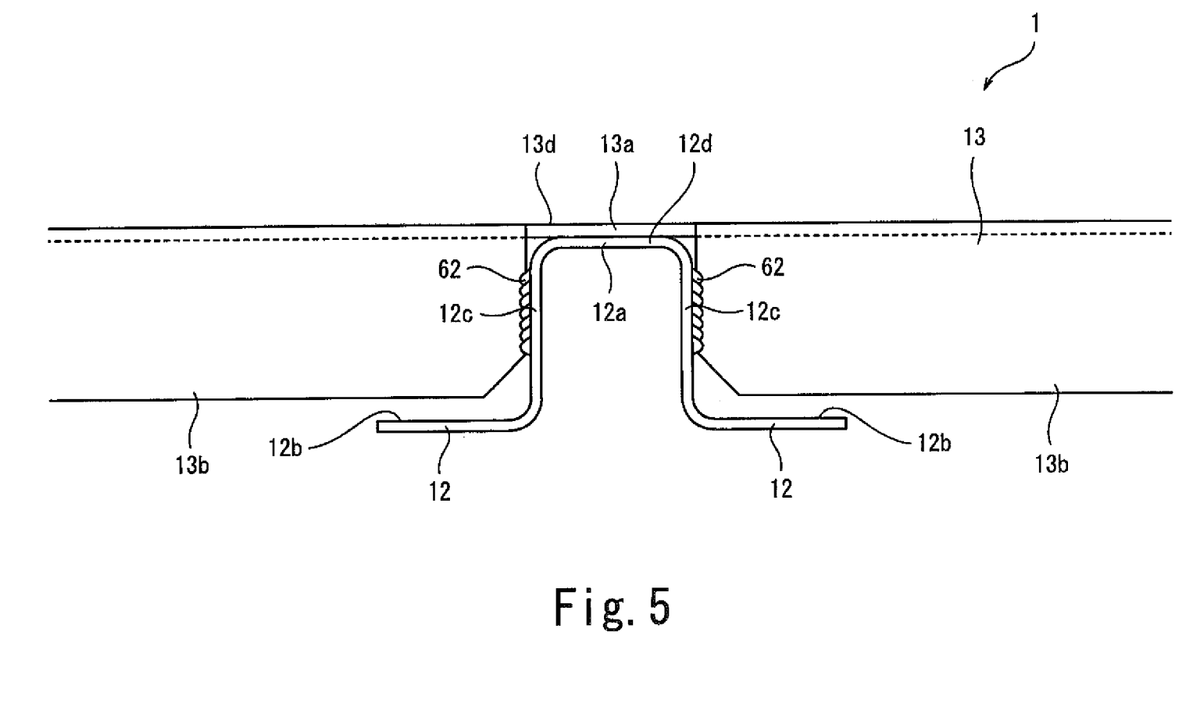
FIG. 5 is an enlarged plan view showing the portion where the side post and the horizontal bar overlap each other as shown in FIG. 3.

The side post 12 and the horizontal bar 13 are fixed to each other by spot welding 61 at a portion where the side post 12 and the horizontal bar 13 overlap each other (see FIG. 4), and the leg portion 13b of the horizontal bar 13 and the leg portion 12c of the side post 12 are fixed to each other by fillet welding 62 (see FIG. 5). As above, the side post 12 and the horizontal bar 13 are coupled to each other by the combination of the spot welding 61 and the fillet welding 62. With this, the horizontal bar 13 extending across a plurality of side posts 12 can be configured as a single member without division, so that welding distortion caused when the side posts 12 and the horizontal bars 13 are assembled in advance in a parallel-cross shape can be suppressed.

Relief holes 13c are formed at the head portion 13a of the horizontal bar 13 so as to be respectively located at both longitudinal direction sides of the portion where the head portion 12d of the side post 12 and the head portion 13a of the horizontal bar 13 overlap each other. To be specific, the relief holes 13c are respectively formed at positions of the head portion 13a, the positions respectively overlapping the flanges 12b of the side post 12. With this, a spot welding electrode can be inserted through the relief hole 13c to penetrate the horizontal bar 13, so that the spot welding 60 is realized. Therefore, after the side posts 12 and the horizontal bars 13 are assembled in a parallel-cross shape, the assembly of the side posts 12 and the horizontal bars 13 can be joined to the side outside plate 11 by the spot welding 60. Since the side posts 12 and the horizontal bars 13 are assembled in advance in a parallel-cross shape, influences on the side outside plate 11 due to welding distortion can be suppressed as compared to a case where the side posts 12 and the horizontal bars 13 are directly joined to the side outside plate 11.

Figure 6:
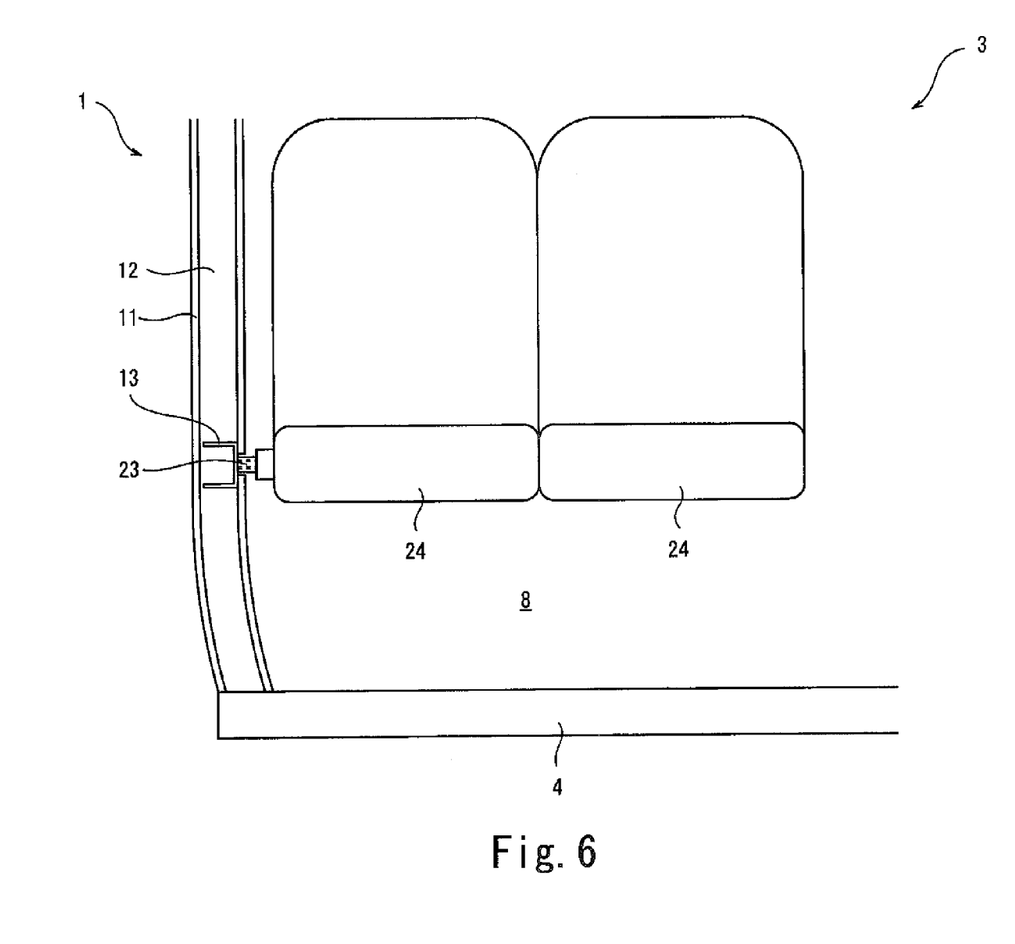
FIG. 6 is a front view showing a state where seat members are provided at the horizontal bar by a metal fitting.

In the present embodiment, the horizontal bars 13 are used as seat receiving members to which the seat members 24 are attached. More specifically, the seat members 24 are attached to the horizontal bars 13, assembled in advance, via metal fittings 23, for example. The seat members 24 are members on which passengers are seated. For example, as shown in FIG. 6, the seat members 24 are arranged along each side bodyshell 1 in two rows in the railcar width direction. The seat members 24 located adjacent to each other in the railcar width direction are joined to each other, and the seat member 24 located at the side bodyshell 1 side is attached to the horizontal bar 13 via the metal fitting 23. The seat members 24 attached as above are arranged at regular intervals in the front-rear direction.

In some cases, leg bases, stanchion poles (grip bars), and the like are attached to the seat members 24. In this case, these are attached to the underframe 4 and the roof bodyshell 7 via metal fittings. Therefore, in a case where the attachment positions of the metal fittings 23 of the seat members 24 are determined before bodyshell joining work of forming the carbody 3 in a box shape, the intervals of the metal fittings 23 after the bodyshell joining work may not correspond to the intervals of the metal fittings of the leg bases or the stanchion poles attached to the underframe 4 or the roof bodyshell 7. On this account, it is preferable that the metal fittings 23 of the seat members 24 be attached after the bodyshell joining work.

In conventional railcar bodyshells, the attachment positions of the metal fittings 23 may overlap the positions of the vertical posts depending on the attachment pitches of the seat members 24 in the front-rear direction. Even if the attachment positions of the metal fittings 23 do not overlap the positions of the vertical posts in design, the attachment positions of the metal fittings may interfere with the vertical posts depending on dimensional accuracy in a case where the attachment positions are determined after the carbody 3 is assembled. To be specific, the vertical posts are assembled so as to be disposed on the horizontal posts, so that in a case where the seat members 24 are arranged in a row, the metal fittings 23 need to be arranged so as to avoid the vertical posts. However, in this case, the seat members 24 may not be arranged at predetermined pitches in the conventional railcar bodyshells.

Since the horizontal bars 13 of the side bodyshell 1 are arranged such that the head portions 13a thereof overlap the side posts 12, surfaces facing the passenger room 8, that is, head surfaces 13d of the horizontal bars 13 are flat over the entire length in the longitudinal direction. With this, the metal fittings 23 of the horizontal bars 13 can be arranged at any positions. Therefore, regardless of the positions of the side posts 12, the metal fittings 23 can be fixed to the head portions 13a of the horizontal bars 13 at predetermined intervals in the longitudinal direction, so that the seat members 24 can be arranged at predetermined intervals in the longitudinal direction.

In the side bodyshell 1 configured as above, since the head portion 13a formed in a plate shape overlaps the head portion 12d of the side post 12, the outside plate panel 14 can be reduced in thickness. With this, the reduction in the passenger room space can be suppressed. Since the head portions 13a of the horizontal bars 13 are flat over the entire length, portions projecting from the head surfaces 13d of the horizontal bars 13 at the passenger room 8 side of the outside plate panel 14 are not formed. Thus, the attachment pitches of the seat members 24 and the like are not restricted, and attachment work of the seat members 24 and the like becomes easy.

Further, since the head portion 13a of the horizontal bar 13 overlaps the head portion 12d of the side post 12, and these overlapping portions are fixed to each other by the spot welding 61, it is unnecessary to use joint members to join the horizontal bars 13 and the side posts 12. Thus, the number of parts can be reduced. By using the spot welding 60 and 61, welding bead finishing work becomes unnecessary. Thus, the manufacturing cost can be reduced.

The side bodyshell 1 is configured such that: the side posts 12 are not cut out, and the horizontal bars 13 are cut out; and each of the horizontal bars 13 is not divided at the arrangement positions of the side posts 12. With this, while maintaining the stiffness of the side bodyshell 1 in the upper-lower direction, the stiffness of the side bodyshell 1 in the longitudinal direction can also be secured.

Embodiment 2

A side bodyshell 1A of Embodiment 2 is similar in configuration to the side bodyshell 1 of Embodiment 1. Therefore, regarding the components of the side bodyshell 1A of Embodiment 2, only the components different from the components of the side bodyshell 1 of Embodiment 1 will be explained. The same reference signs are used for the same components, and a repetition of the same explanation is avoided. The same is true for the components of a side bodyshell 1B of Embodiment 3 and the components of a side bodyshell 1C of Embodiment 4.

Figure 7:
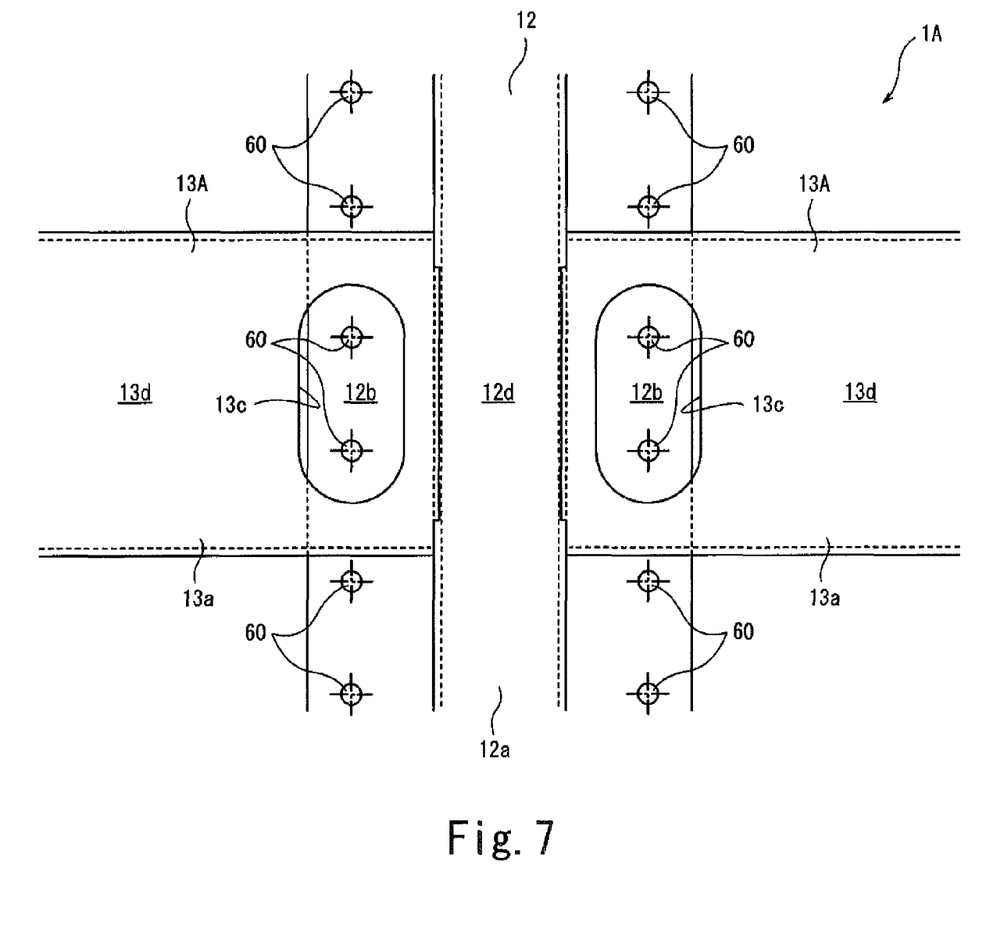
FIG. 7 is an enlarged side view showing an overlapping portion of the side bodyshell according to Embodiment 2.
Figure 8:
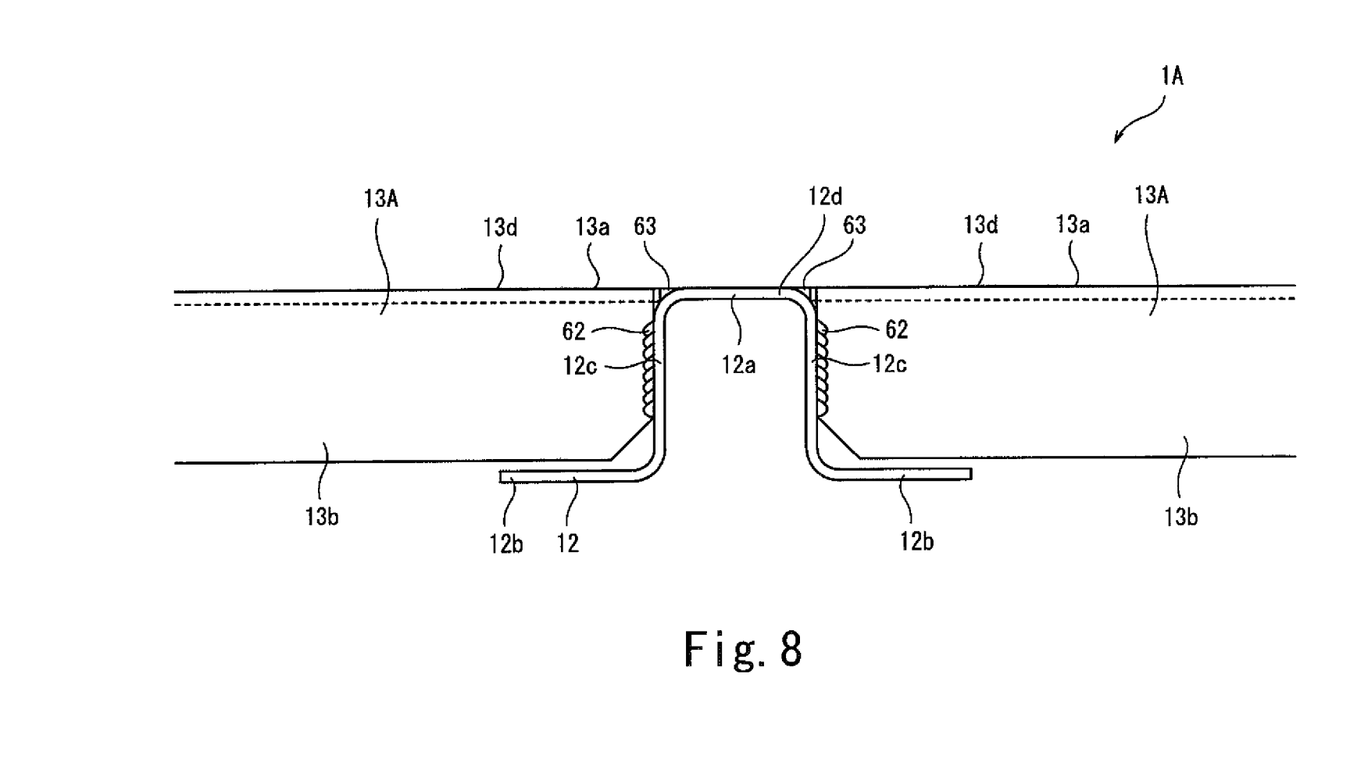
FIG. 8 is an enlarged plan view showing the portion where the side post and the horizontal bar overlap each other as shown in FIG. 7.

As shown in FIGS. 7 and 8, the side bodyshell 1A includes a plurality of horizontal bars 13A. Each of the horizontal bars 13A extends in the longitudinal direction and has a U-shaped cross section. The horizontal bar 13A is arranged between the side posts 12. One of longitudinal direction ends of the horizontal bar 13A contacts the leg portion 12c of one of the side posts 12, and the other longitudinal direction end of the horizontal bar 13A contacts the leg portion 12c of the other side post 12. To be specific, in the side bodyshell 1 of Embodiment 1, the horizontal bar 13 is arranged at the side posts 12 so as not to be divided in the longitudinal direction. However, in the side bodyshell 1A of the present embodiment, the horizontal bars 13A are separated from one another in the longitudinal direction at positions at which the side posts 12 are respectively arranged.

The heights of the head portions 13a of the horizontal bars 13A are adjusted such that surfaces of the head portions 13a are flush with surfaces of the head portions 12d of the side posts 12. The leg portions 13b of the horizontal bars 13A are fixed to the leg portions 12c of the side posts 12 by the fillet welding 62, and the head portions 13a are fixed to the head portions 12d of the side posts 12 by flare welding 63. With this, the horizontal bars 13A and the side posts 12 are joined to one another. Surfaces of welded portions by the flare welding 63 are subjected to surface finish so as to be flush with the head surfaces 13d of the horizontal bars 13A.

Further, the relief holes 13c are respectively formed at both longitudinal direction end portions of the head portion 13a of the horizontal bar 13A. With this, the spot welding electrode can be inserted through the relief hole 13c. The flange 12b of the side post 12 and the side outside plate 11 are fixed to each other by the spot welding 60. Thus, the side post 12 and the side outside plate 11 can be joined to each other.

In the side bodyshell 1A configured as above, a surface of the head portion 12d of the side post 12 and a surface of the head portion 13a of the horizontal bar 13A are flush with each other. Therefore, the side bodyshell 1A can be reduced in thickness by the thickness of the head portion 13a. Thus, the reduction in the passenger room space can be suppressed.

Even in a case where the horizontal bars 13A are separated from one another in the longitudinal direction, the horizontal bars 13A and the side posts 12 can be assembled in advance by welding joining and then can be attached to the side outside plate 11. Therefore, as compared to a case where the horizontal bars 13A and the side posts 12 are directly joined to the side outside plate 11 by welding, influences on the side outside plate 11 due to welding distortion can be prevented.

Although the horizontal bars 13A extending in the longitudinal direction are separated from one another at the arrangement positions of the side posts 12, the horizontal bars 13A and the side posts 12 can be joined to one another in such a manner that: the leg portion 13b of the horizontal bar 13A and die leg portion 12c of the side post 12 are fixed to each other by the fillet welding 62; and an end portion of the head portion 13a of the horizontal bar 13A and an end portion of the head portion 12d of the side post 12 are fixed to each oilier by the flare welding 63. With this, it is unnecessary to use the joint members, and the head surfaces 13d of the horizontal bars 13A can be made flat over the entire length.

In addition, the side bodyshell 1A of Embodiment 2 has the same operational advantages as the side bodyshell 1 of Embodiment 1.

Embodiments 3

Figure 9:
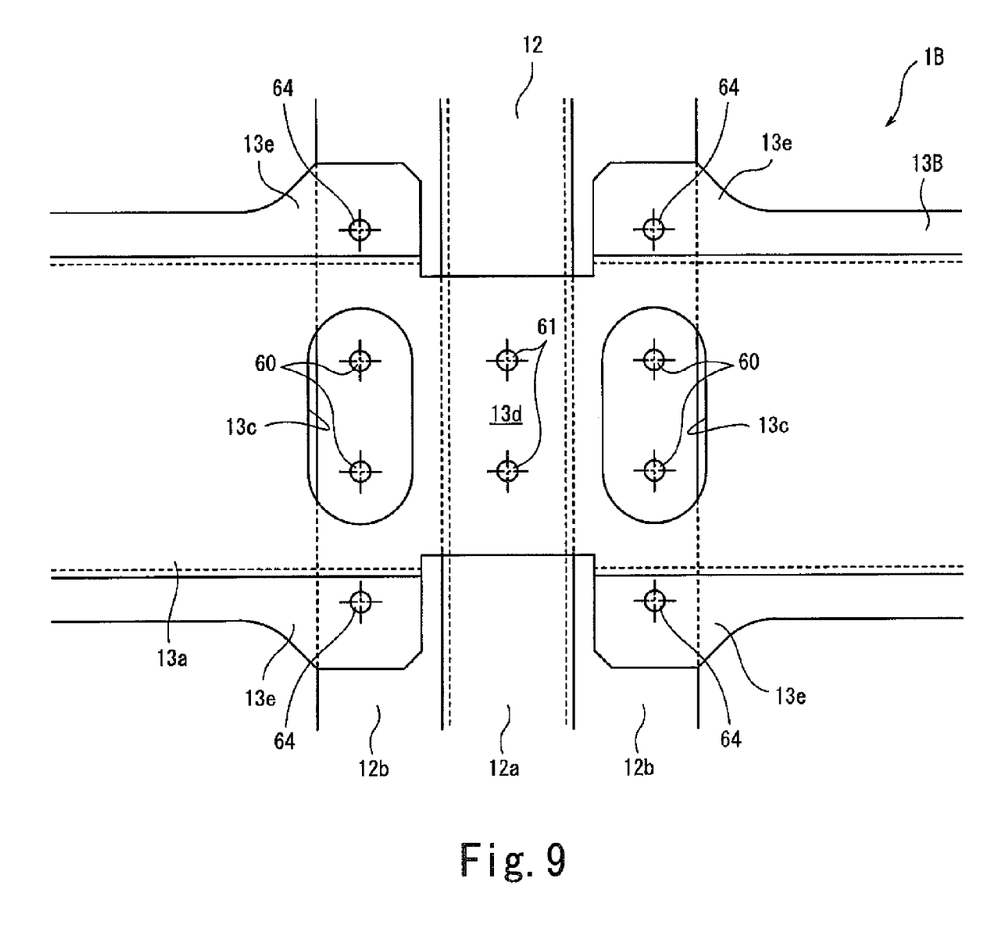
FIG. 9 is an enlarged side view showing the overlapping portion of the side bodyshell according to Embodiment 3.
Figure 10:
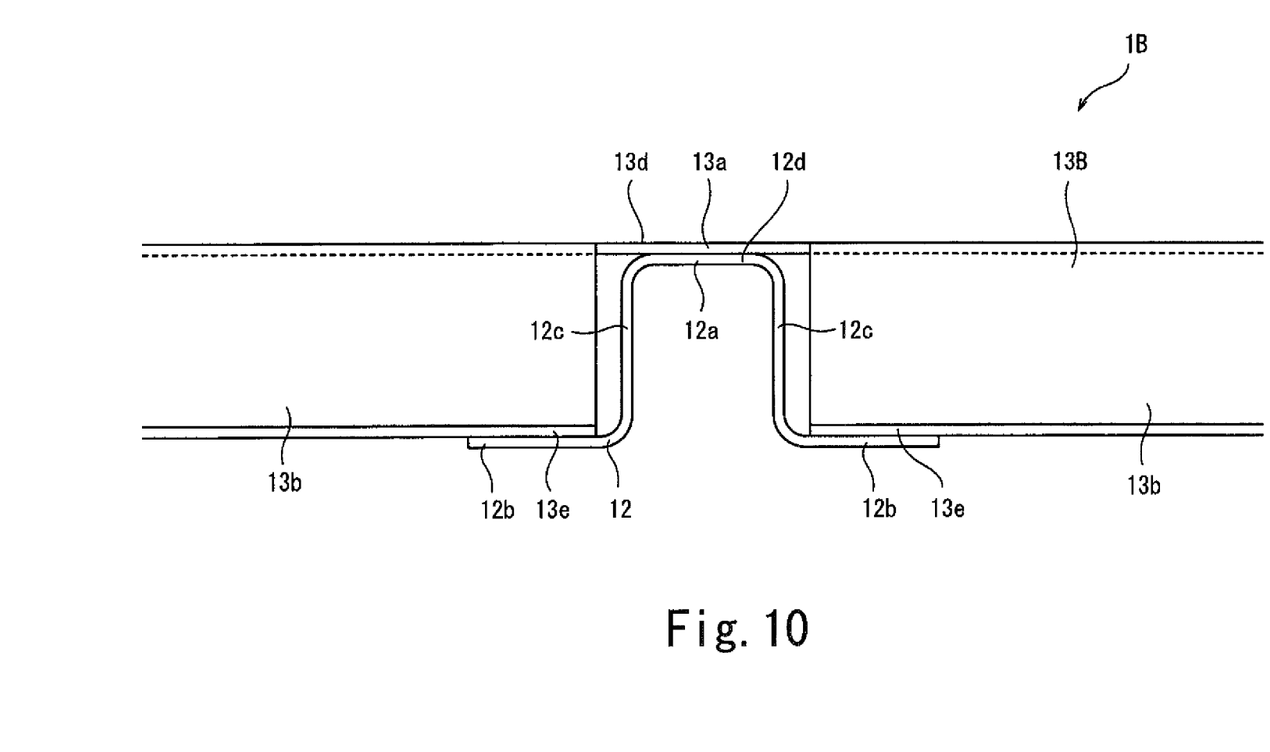
FIG. 10 is an enlarged plan view showing the portion where the side post and the horizontal bar overlap each other as shown in FIG. 9.

As shown in FIGS. 9 and 10, the side bodyshell 1B of Embodiment 3 includes horizontal bars 13B. Each of the horizontal bars 13B includes the head portion 13a, the pair of leg portions 13b, and flanges 13e, Except for regions where the cutout portions 15 are formed, the horizontal bar 13B is formed to have a hat-shaped cross section. Both longitudinal direction end portions of each of the flanges 13e of the horizontal bar 13B are arranged so as to respectively overlap the flanges 12b of the side posts 12. The flange 12b of the side post 12 and the flange 13e of the horizontal bar 13B, which overlap each other, are fixed to each other by spot welding 64. Thus, the side posts 12 and the horizontal bars 13B are joined to one another. By the spot welding 64, the fillet welding at the side post 12 and the horizontal bar 13B can be omitted. Thus, the attachment cost can be further reduced.

Since the two flanges 12b and 13e are joined to each other by the spot welding 60 and 64, me joining strength can be improved. Since the horizontal bar 13B is provided with the flanges 13e, the stiffness of the horizontal bar 13B can be improved. Therefore, the thickness of the horizontal bar 13B can be made smaller than the thickness of the horizontal bar 13 of Embodiment 1 and the thickness of the horizontal bar 13 A of Embodiment 2.

In addition, the side bodyshell 1B of Embodiment 3 has the same operational advantages as the side bodyshell 1 of Embodiment 1.

Embodiment 4

Figure 11:
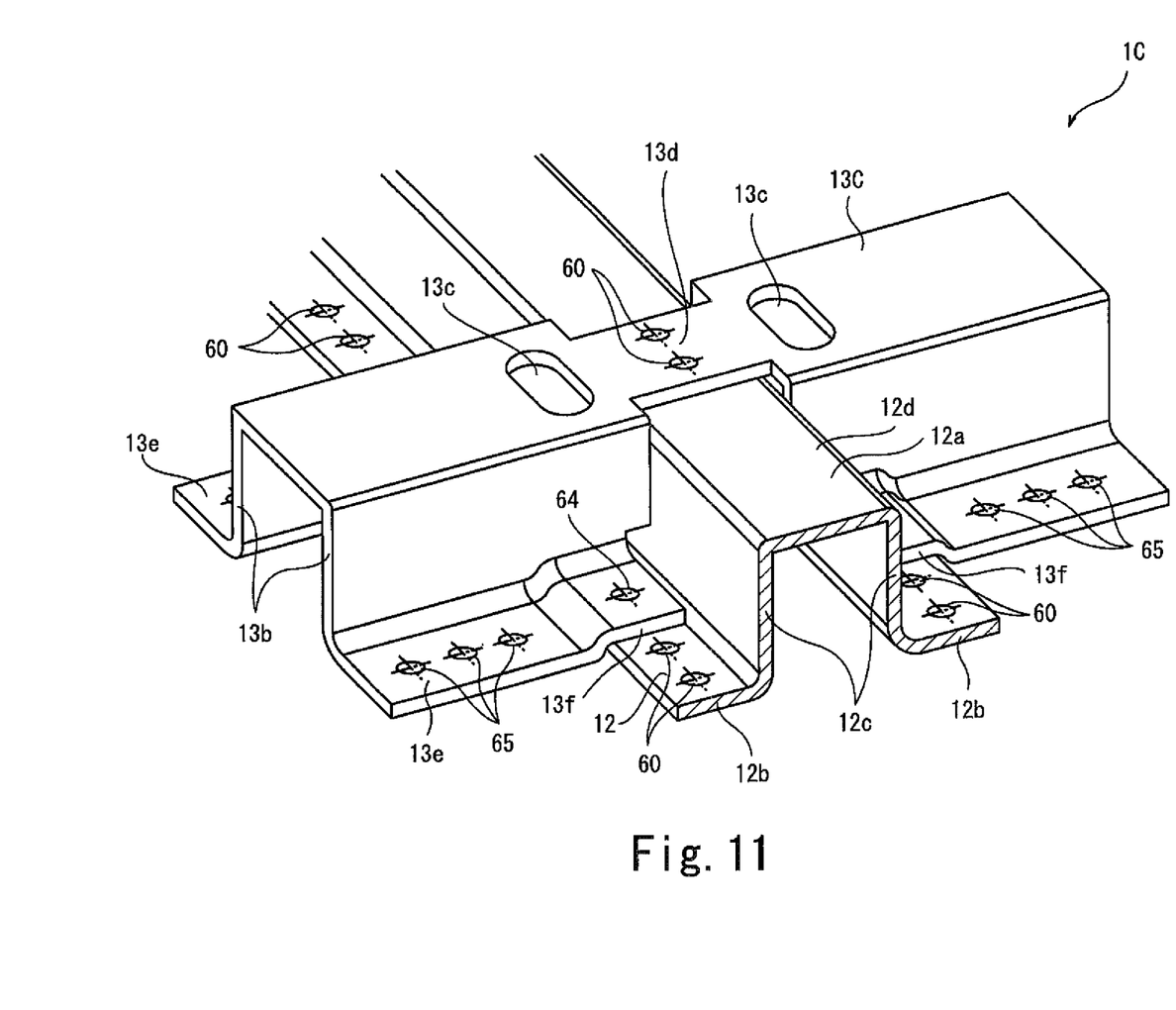
FIG. 11 is an enlarged side view showing the overlapping portion of the side bodyshell according to Embodiment 4.
Figure 12:
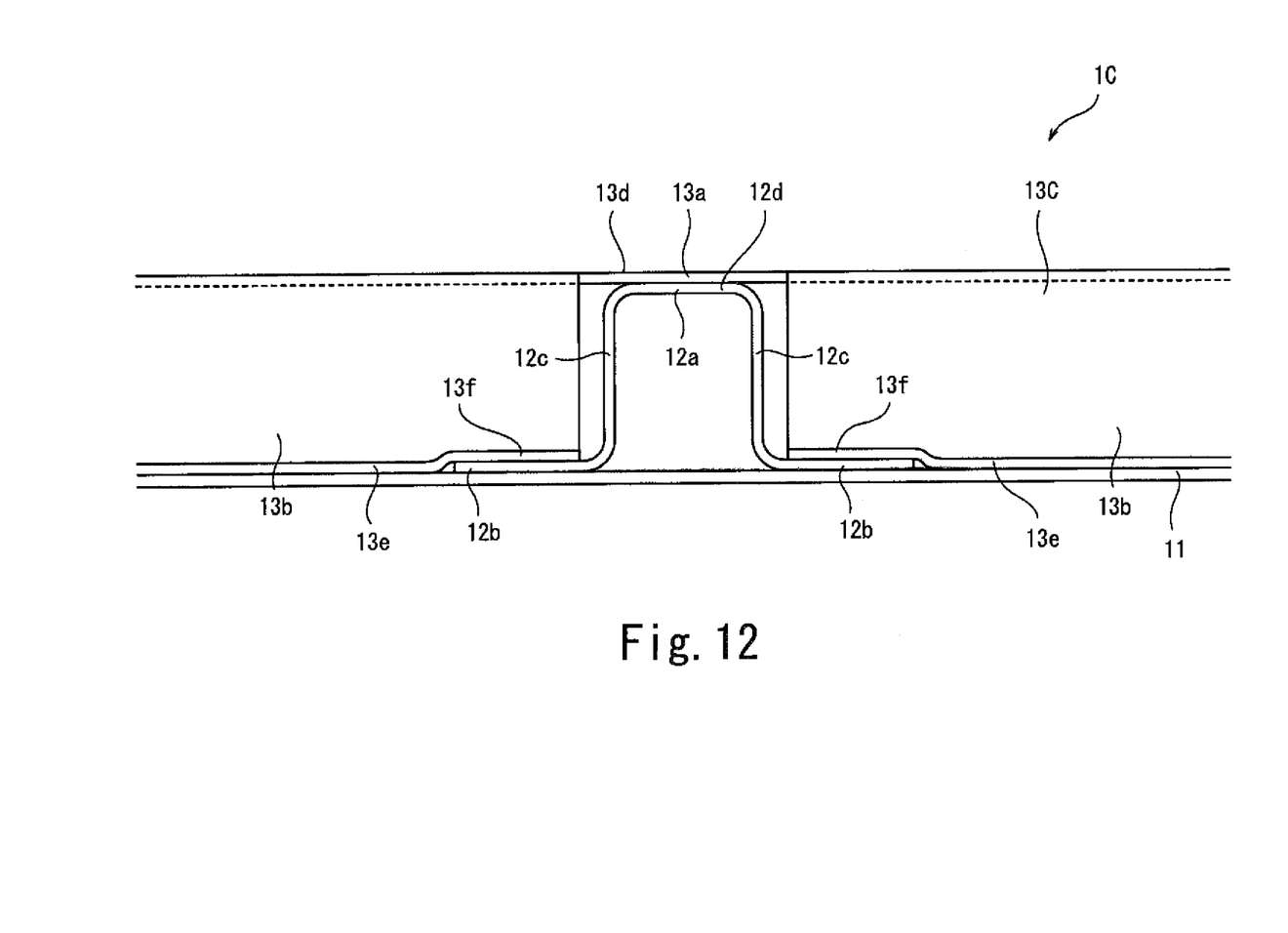
FIG. 12 is an enlarged plan view showing the portion where the side post and the horizontal bar overlap each other as shown in FIG. 11.

As shown in FIGS. 11 and 12, the side bodyshell 1C of Embodiment 4 is substantially the same in configuration as the side bodyshell 1B of Embodiment 3. However, the side bodyshell 1C of Embodiment 4 is different in configuration from the side bodyshell 1B of Embodiment 3 in that a necking portion 13f is formed at the flange 13e of a horizontal bar 13C.

To be specific, a longitudinal direction end portion of the flange 13e of the horizontal bar 13C overlaps the flange 12b of the side post 12, and this overlapping portion of the flange 13e is subjected to necking. Each of both longitudinal direction end portions of the flange 13e subjected to the necking is formed in a step shape so as to be disposed on the flange 12b. The flange 13e subjected to the necking as above is joined to the side outside plate 11 by spot welding 65 except for the necking portion 13f, and the necking portion 13f is joined to the flange 12b of the side post 12 by the spot welding 64. With this, the strength of the side outside plate 11 can be improved. The side bodyshell 1C of the present embodiment using the horizontal bars 13C on which the necking portions 13f are formed as above is especially useful when the side outside plate 11 is constituted by not the corrugated plate shown in FIG. 2 but a flat plate.

In addition, the side bodyshell 1C of Embodiment 4 has the same operational advantages as the side bodyshells 1A and 1B of Embodiments 1 and 3.

Other Embodiments

Each of Embodiments 1 to 4 has explained a case where the railcar bodyshell of the present invention is applied to the side bodyshell 1, 1A, 1B, or 1C. However, the railcar bodyshell of the present invention may be applied to the end bodyshell 6 or the roof bodyshell 7. In addition, unlike Embodiments 1 to 3 in each of which the railcar bodyshell of the present invention is applied to any one of the bodyshells 1, 6, and 7, the railcar bodyshell of the present invention may be applied to each of the bodyshells 1, 6, and 7. For example, the railcar 2 may be configured such that the railcar bodyshell of the present invention is applied to each of the side bodyshells 1 and the end bodyshells 6.

In Embodiments 1 to 4, the side post 12 that is the first frame extends in the upper-lower direction, and the horizontal bar 13 that is the second frame extends in the longitudinal direction. However, these frames do not have to extend in these directions. For example, in a case where these frames are provided at the end bodyshell 6, an end post that is the first frame extends in the upper-lower direction, and the horizontal bar 13 extends in the railcar width direction along an end outside plate. These two frames may be arranged so as to be perpendicular to each other and inclined relative to the upper-lower direction. In each of the side bodyshells 1 and 1A to 1C of Embodiments 1 to 4, the horizontal bars 13 are used as the receiving members for the seat members 24. However, the horizontal bars 13 do not have to be used as the receiving members. The horizontal bars 13 may be window heads or window sills respectively arranged at both upper-lower direction sides of the window 1b.

In Embodiments 1 to 4, the side post 12 having a hat-shaped cross section is adopted. However, one of the leg portions 12c may be omitted from the side post 12, that is, the side post 12 may have a Z-shaped cross section. Similarly, one of the leg portions 13b may be omitted from the horizontal bar 13, that is, the horizontal bar 13 may have an L-shaped cross section.

From the foregoing explanation, many modifications and other embodiments of the present invention are obvious to one skilled in the art. Therefore, the foregoing explanation should be interpreted only as an example and is provided for the purpose of teaching the best mode for carrying out the present invention to one skilled in the art. The structures and/or functional details may be substantially modified within the spirit of the present invention.

REFERENCE SIGNS LIST 1, 1A, 1B, 1C side bodyshell
2 railcar
6 end bodyshell
7 roof bodyshell
8 passenger room
11 outside plate
12 side post
12c leg portion
12d head portion
13, 13A, 13B, 13C horizontal bar
13a head portion
13b leg portion
13c relief hole
13e flange
14 outside plate panel
15 cutout portion
23 metal fitting
24 seat member
60, 61, 64, 65 spot welding
62 fillet welding
63 flare welding

The invention claimed is:

1. A railcar bodyshell comprising:
an outside plate;
first frames arranged at an inner surface of the outside plate and each including
a plate-shaped first head portion having a surface spaced apart from and substantially parallel to the outside plate,
at least one first leg portion extending from the first head portion in a direction substantially perpendicular to the first head portion, and
a first flange continuously formed from the first leg portion and extending substantially parallel to the first head portion; and
second frames arranged perpendicular to the first frames and each including
a plate-shaped second head portion having a surface spaced apart from and substantially parallel to the outside plate, and
an opening portion formed at the second head portion and located above the first flange, wherein:
at each of portions where the first frames and the second frames intersect with each other, the second head portion overlaps the first head portion;
the first flanges of the first frames and the outside plate are joined directly to each other at the opening portions of the second frames, and
longitudinal direction end portions of the second frames are joined to the first leg portions of the first frames.

2. The railcar bodyshell according to claim 1, wherein:
each of the second frames includes at least one second leg portion extending from the second head portion in a direction substantially perpendicular to the second head portion;
the at least one second leg portion includes a cutout portion at a position where the first frame and the second frame overlap each other; and
the first frames are inserted through the cutout portions of the second frames.

3. The railcar bodyshell according to claim 1, wherein the second frames are arranged such that surfaces of longitudinal direction end portions of the second head portions of the second frames are flush with surfaces of the first head portions of the first frames.

4. The railcar bodyshell according to claim 1 wherein:
each of the second frames further includes
at least one second leg portion extending from the second head portion in a direction substantially perpendicular to the second head portion, and
a second flange continuously formed from the second leg portion and extending substantially parallel to the second head portion; and
the first frames, the second frames, and the outside plate are joined to one another by spot welding at portions where the first flanges and the second flanges overlap each other.

5. The railcar bodyshell according to claim 1, wherein the first frames and the second frames are joined to each other by spot welding at portions where the first head portions and the second head portions overlap each other.

6. The railcar bodyshell according to claim 1, further comprising seat members, wherein:
the first frames are side posts extending in a railcar upper-lower direction;
the second frames are seat receiving members extending in a railcar longitudinal direction; and
the seat members are attached to the second frames.

7. A railcar comprising the railcar bodyshell according to claim 1.

* * * * *